Aug. 18, 1931.  V. R. BAYSINGER  1,819,807
HEATING PACK AND COMPOSITION THEREFOR
Filed Aug. 4, 1928
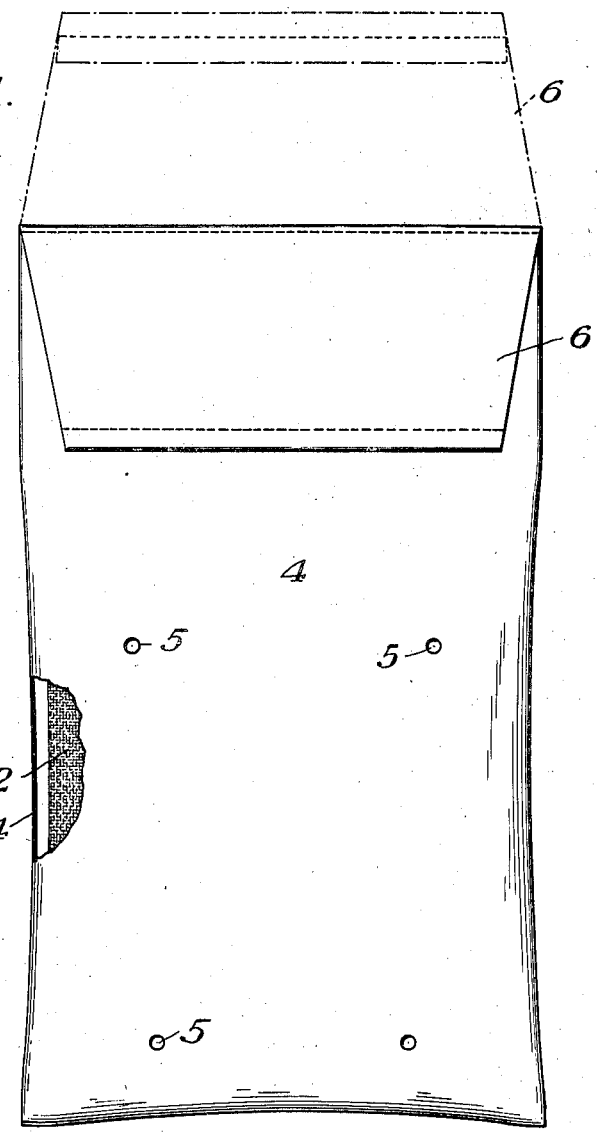
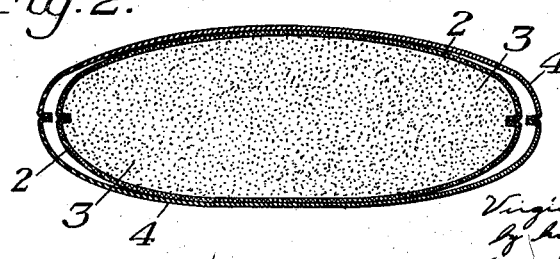
INVENTOR Patented Aug. 18, 1931

1,819,807

UNITED STATES PATENT OFFICE

VIRGIL R. BAYSINGER, OF PITTSBURGH, PENNSYLVANIA, ASSIGNOR, BY DIRECT AND MESNE ASSIGNMENTS, TO TORRIDAIRE COMPANY, A CORPORATION OF DELAWARE

HEATING PACK AND COMPOSITION THEREFOR

Application filed August 4, 1928. Serial No. 297,543.

This invention relates to heating pads or packs for use in applying heat to the body in a manner similar to a hot water bottle, and more particularly is for a pad wherein the heat is generated by means of normally inert chemicals which can be made to react when desired to liberate heat.

Various heating pads of this general nature have been proposed wherein the principal constituents of the heat generating composition are ferrous materials and some agent for reacting therewith to produce an exothermic reaction. Such devices or compositions as have been heretofore available are usually set into action by mixing a small quantity of water with the heat generating constituents. The compositions which have been used heretofore require a relatively long period of time in which to reach a maximum temperature, and the maximum temperature in most cases is relatively lower than the temperature required of an article of this nature. Furthermore, the life of the compositions heretofore used has been relatively short, and they are capable of giving heat continuously or intermittently over only a relatively short time.

According to the present invention I provide a heat liberating composition wherein the inert chemical materials may be caused to react by the addition of water thereto, but wherein a relatively high degree of heat is obtained, and this high temperature can be reached in two or three minutes after the addition of water thereto. The composition will continue to produce heat continuously over a relatively long period, and can be repeatedly used by the addition of water thereto. A small amount of the composition is capable of producing a high degree of heat either continuously or intermittently for more than 80 to 100 hours.

One form of a pad for utilizing my invention is shown in the accompanying drawings, in which Figure 1 is a plan view of the pad, and Figure 2 is a transverse section through the pad.

In the drawings, 2 designates a bag of canvas or other heavy fabric. The heat generating composition 3 is placed in this bag. The quantity of composition is considerably less than enough to fill the bag, so that the contents can be shaken up and so that the bag will conform conveniently to the portion of the body to which it is applied. The bag 2 is removably inserted in an envelope of a waterproof material 4. The envelope 4 has perforations 5 to permit of the infiltration of air, air being necessary to the continued reactions of the chemicals. The envelope 4 has a flap 6 for closing that end through which the bag 2 is inserted and removed.

The composition 3 comprises pure crushed cast iron, crushed carbon steel and means for accelerating the oxidation of the iron and steel. Preferably the composition contains Epsom salts (magnesium sulphate) table salt (sodium chloride) and ammonium muriate (ammonium chloride).

These ingredients are mixed in substantially the following proportions:

| | Pounds |
|---|---|
| Crushed cast iron | 95 |
| Crushed carbon steel | 5 |
| Epsom salt | ½ |
| Sodium chloride | ½ |
| Ammonium chloride | ¼ |

The iron and steel are crushed to a relatively fine powder. Crushed metal is superior to filings because of its greater purity.

These materials after being thoroughly mixed up are placed in the canvas bags 3. Each bag contains only a relatively small amount of the materials, possibly one or two pounds. To start the generation of heat, a small quantity of water is poured into the bag, about two tablespoonsful, and the bag is agitated to thoroughly mix the water through the composition. The more thoroughly the water is mixed into the composition, the more quickly the contents will reach a maximum temperature and the higher will be the temperature. If only a relatively low heat is desired, the bag need be agitated only slightly.

After the temperature of the composition has been brought up to the maximum, or to the desired temperature, the canvas bag is placed in the rubber envelope. The rubber envelope retards the evaporation of the water so that the reaction continues for a longer period of time. The holes 5 permit air in limited quantities to enter the bag and sustain the reaction.

The normal period of operation for an ordinary size bag is about ten hours for a single application of water, but if it is desired to stop the reaction sooner, the canvas bag may merely be removed from the rubber bag, hence the water will evaporate and the period of the reaction will be shorter. The bag may be used several times before the contents have been completely exhausted.

By using both iron and steel, the maximum temperature is higher than if one of these materials alone were used, the period of reaction is longer, and the time required to reach a maximum temperature is shorter. Presumably, upon the application of water, the reaction starts by the oxidation of the carbon steel, but as the temperature increases, the reaction also takes place with the iron. Whatever the theory extensive experiments have proved that the maximum temperature is raised by using both materials, and the life of the composition is materially longer. Also, ammonium chloride or sodium chloride, alone or in combination, are sufficient to give fairly satisfactory results, but by the addition of Epsom salts, the reaction is stimulated and more efficient results are obtained.

The composition is a relatively stable one and the bags can be kept for an indefinite period without deterioration, even though the atmosphere be fairly damp. This makes them highly desirable for use for industrial purposes, such for instance as mines and mills wherein something of this nature is required for emergencies. The invention has a further desirable feature in that with the initial operation the ammonium chloride will liberate ammonia, and ammonia has a stimulating effect on the respiratory organs. This makes the bags further desirable for use in industrial establishments.

While I have described the preferred nature and proportions of the various ingredients, it will be understood that the invention is not limited to these particular proportions, and that chemical equivalents of the various substances mentioned may be employed where they are suitable. Neither is the invention confined to the particular construction of bag herein specifically described and illustrated.

I claim:

1. A heat generating compound for heating pads comprising crushed cast iron and crushed carbon steel, and a salt for accelerating the oxidation of the iron and steel when water is applied to the composition.

2. A heat generating composition for heating pads comprising crushed cast iron and crushed carbon steel, the amount of steel being considerably less than the amount of cast iron, and a salt for accelerating oxidation of the iron and steel when water is applied to the composition.

3. A heat generating composition for heating pads comprising crushed cast iron and crushed steel, the amount of cast iron being more than ten times the amount of crushed steel, and a salt for accelerating the oxidation of the iron and steel when water is applied to the composition.

4. A heat generating compound for heating pads comprising crushed cast iron an crushed steel in the proportion of approximately 95 pounds of cast iron to 5 pounds of steel, and a salt for inducing oxidation of the iron and steel when water is added to the mixture.

5. A heat generating compound for heating pads comprising crushed cast iron and crushed carbon steel, the proportion of cast iron being much greater than the proportion of carbon steel, and a relatively small quantity of ammonium chloride.

6. A heat generating compound for heating pads comprising crushed cast iron and crushed carbon steel, the proportion of cast iron being much greater than the the proportion of carbon steel, and a relatively small quantity of ammonium chloride, said composition also containing Epsom salt and sodium chloride.

7. A heat generating compound for heating pads comprising crushed cast iron and crushed carbon steel in substantially the proportion of 5 pounds of steel to 95 pounds of cast iron, said composition also containing ammonium chloride in the proportion of substantially one-quarter pound to 100 pounds of crushed metal, sodium chloride in substantially the proportion of one-half pound to 100 pounds of crushed metal, and magnesium sulphate in the proportion of substantially one-half pound to 100 pounds of metal.

In testimony whereof I have hereunto set my hand.

VIRGIL R. BAYSINGER.